(12) United States Patent
Takaki

(10) Patent No.: US 11,430,334 B2
(45) Date of Patent: Aug. 30, 2022

(54) SYSTEMS AND METHODS FOR ADAPTABLE REAR-END COLLISION ALERTS

(71) Applicant: DENSO CORPORATION, Kariya (JP)

(72) Inventor: Ryo Takaki, Southfield, MI (US)

(73) Assignee: DENSO CORPORATION, Aichi (JP)

( * ) Notice: Subject to any disclaimer, the term of this patent is extended or adjusted under 35 U.S.C. 154(b) by 42 days.

(21) Appl. No.: 17/076,046

(22) Filed: Oct. 21, 2020

(65) Prior Publication Data

US 2022/0122460 A1    Apr. 21, 2022

(51) Int. Cl.
*G08G 1/16* (2006.01)
*B60Q 9/00* (2006.01)
*G08G 1/0965* (2006.01)

(52) U.S. Cl.
CPC .............. *G08G 1/166* (2013.01); *B60Q 9/008* (2013.01); *G08G 1/0965* (2013.01)

(58) Field of Classification Search
CPC ....... G08G 1/166; G08G 1/0965; B60Q 9/008
See application file for complete search history.

(56) References Cited

U.S. PATENT DOCUMENTS

| | | | | |
|---|---|---|---|---|
| 6,017,102 A * | 1/2000 | Aga | ...................... | B60T 7/12 303/191 |
| 7,124,027 B1 * | 10/2006 | Ernst, Jr | ............... | B60W 30/09 701/301 |
| 8,204,678 B2 * | 6/2012 | Matsuno | ................. | G08G 1/166 701/300 |
| 2009/0212930 A1 * | 8/2009 | Pfeiffer | ................ | B62D 15/029 701/41 |
| 2013/0253796 A1 * | 9/2013 | Luo | .......................... | G01S 11/12 701/1 |
| 2017/0174212 A1 * | 6/2017 | Gussen | ................. | B60W 50/10 |
| 2017/0274856 A1 * | 9/2017 | Konet | .................... | H04W 4/027 |
| 2018/0029533 A1 * | 2/2018 | Goudy | .................... | G08G 1/166 |
| 2018/0257646 A1 | 9/2018 | Takeuchi | | |
| 2019/0088138 A1 * | 3/2019 | Kang | ..................... | B60W 10/04 |
| 2020/0062248 A1 * | 2/2020 | Hasegawa | ......... | B60W 30/0956 |
| 2020/0111356 A1 * | 4/2020 | Salomonsson | ... | G08G 1/096725 |
| 2020/0114821 A1 * | 4/2020 | Kim | ........................ | G01S 7/003 |

(Continued)

FOREIGN PATENT DOCUMENTS

| | | | |
|---|---|---|---|
| CN | 101488290 A | * | 7/2009 |
| CN | 101783081 A | * | 7/2010 |
| CN | 107878308 A | * | 4/2018 |

(Continued)

*Primary Examiner* — Chico A Foxx
(74) *Attorney, Agent, or Firm* — Christopher G. Darrow; Darrow Mustafa PC

(57) ABSTRACT

Systems, methods, and other embodiments described herein relate to improving alert activation for rear collision avoidance. In one embodiment, a method includes responsive to detecting a target object that is located behind a subject vehicle, determining, by the subject vehicle, characteristics about a surrounding environment of the subject vehicle, including of the target object. The method includes analyzing the characteristics to identify lateral free space next to the subject vehicle that is an area without obstruction beside the subject vehicle. The method includes modifying a collision threshold for activating an alert to the target object according to the lateral free space.

20 Claims, 9 Drawing Sheets

(56) References Cited

U.S. PATENT DOCUMENTS

2021/0061266 A1 * 3/2021 Pontisakos ........ B60W 30/0956

FOREIGN PATENT DOCUMENTS

| DE | 102006010275 A1 | * | 12/2006 | ............. B60Q 9/008 |
| DE | 102011115740 A1 | * | 4/2013 | ............ E05C 17/006 |
| DE | 102011116822 A1 | * | 4/2013 | ............. G08G 1/165 |
| GB | 2500312 A | * | 9/2013 | ............. B60Q 1/323 |
| JP | 2013133070 A | * | 7/2013 | |

* cited by examiner

SYSTEMS AND METHODS FOR ADAPTABLE REAR-END COLLISION ALERTS

TECHNICAL FIELD

The subject matter described herein relates in general to systems and methods for rear-end pre-collision safety alerts, and, more particularly, to adapting a collision threshold for activating the rear-end pre-collision alerts according to lateral free space.

BACKGROUND

Vehicles may employ different safety systems to protect passengers, such as airbags, active/passive restraints, automated control assistance (e.g., anti-lock braking systems (ABS)), and so on. While these systems improve the safety of the passengers, they do not generally function to improve the safety of the passengers with respect to surrounding threats (e.g., approaching vehicles). That is, the noted systems facilitate directly preventing crashes and/or protecting passengers against injury for the vehicle in which they are installed, but do not help other vehicles in the surrounding environment avoid collision hazards with the instant vehicle.

Thus, surrounding vehicles or other moving objects (e.g., bicycles) are generally left to their own abilities in avoiding accidents. However, in various circumstances, a subject vehicle may activate rear-end pre-collision alerts using hazard lights of the subject vehicle. Such systems may estimate paths of the other objects to determine when to activate the alerts. Accordingly, because actual paths cannot be predicted with absolute certainty, the systems may generate false alerts when, for example, a vehicle is changing lanes, or the estimate is not otherwise accurate. As such, there is generally a need to better inform the surrounding vehicles in order to further ensure the safety of the subject vehicle.

SUMMARY

In one embodiment, example systems and methods associated with improving alert activation for rear collision avoidance are disclosed. As previously noted, accurately determining when to activate rear-collision alerts can be a difficult task that may result in false alerts. This may be especially true in instances where an approaching vehicle is changing lanes, and the subject vehicle fails to accurately account for the lane change. As such, the system may activate an alert inappropriately because of the failure to accurately identify maneuvers of the approaching vehicle, thereby degrading reliance on the alerts and also the efficacy of the alerts.

However, in one embodiment, a disclosed approach resolves difficulties with false alerts by adapting a collision threshold for activating the alerts according to available lateral free space. For example, as the subject vehicle travels along a road, space to either side of the subject vehicle may vary. The variance in available lateral free space may occur due to obstacles along the side of the road, other vehicles moving in parallel lanes, varying widths of road shoulders, the lane of travel of the subject vehicle, and so on. In any case, by considering the available lateral free space, the disclosed approach can better assess whether an approaching target object (e.g., a vehicle) is likely to collide with the subject vehicle, is transitioning to another lane, or can otherwise avoid the subject vehicle by maneuvering into the lateral free space.

Therefore, in at least one arrangement, a subject vehicle implementing the disclosed approach detects a target object that is approaching the subject vehicle from a rear position while further gathering sensor data about a surrounding environment. The subject vehicle may then determine characteristics of the approaching vehicle and the surrounding environment from the sensor data, such as a width of the approaching vehicle, a predicted path of the approaching vehicle, lateral free space next to the subject vehicle, and so on. According to the characteristics, the subject vehicle can, in one or more approaches, modify the collision threshold for activating an alert. For example, the subject vehicle may determine whether the lateral free space is of a particular size (e.g., satisfies a minimum distance for adjusting the collision threshold). In further aspects, the subject vehicle may determine the lateral free space as a relative measurement according to a width of the target vehicle (e.g., normalized to the width of the target vehicle). In this way, the subject vehicle can determine whether the lateral free space is adequate for the target object to maneuver around the subject vehicle (e.g., to perform a lane change or emergency maneuver without colliding with the subject vehicle).

In any case, when the subject vehicle judges the lateral free space to satisfy a modification threshold, then the subject vehicle modifies the collision threshold to adapt how the alerts are generated. In one configuration, the subject vehicle modifies an overlap threshold that is part of the collision threshold. The overlap threshold specifies a permissible extent of overlap between widths of the subject vehicle and the target object such that, for example, when the lateral free space is wider, a greater amount of overlap may be permissible. Alternatively, or additionally, the subject vehicle may further modify a time-to-collision (TTC) threshold that is part of the collision threshold by increasing (e.g., 0.5 to 1.5 seconds) the TTC threshold when the lateral free space is judged to be inadequate (e.g., less than a width of the target object). In this way, the subject vehicle can avoid generating false alerts and better provide the alerts to the target object to avoid collisions.

In one or more arrangements, a collision detection system is disclosed. The collision detection system includes one or more processors and a memory that is communicably coupled to the one or more processors. The memory stores a detection module including instructions that, when executed by the one or more processors, cause the one or more processors to, responsive to detecting a target object that is located behind a subject vehicle, determine, by the subject vehicle, characteristics about a surrounding environment of the subject vehicle, including of the target object. The detection module includes instructions to analyze the characteristics to identify lateral free space next to the subject vehicle that is an area without obstruction beside the subject vehicle. The memory stores an alert module including instructions that, when executed by the one or more processors, cause the one or more processors to modify a collision threshold for activating a warning to the target object according to the lateral free space.

In one or more arrangements, a non-transitory computer-readable medium is disclosed. The instructions include instructions to, responsive to detecting a target object that is located behind a subject vehicle, determine, by the subject vehicle, characteristics about a surrounding environment of the subject vehicle, including of the target object. The instructions include instructions to analyze the characteristics to identify lateral free space next to the subject vehicle that is an area without obstruction beside the subject vehicle. The instructions include instructions to modify a collision threshold for activating a warning to the target object according to the lateral free space.

In one or more arrangements, a method is disclosed. The method may include, responsive to detecting a target object that is located behind a subject vehicle, determining, by the subject vehicle, characteristics about a surrounding environment of the subject vehicle, including of the target object. The method includes analyzing the characteristics to identify lateral free space next to the subject vehicle that is an area without obstruction beside the subject vehicle. The method includes modifying a collision threshold for activating an alert to the target object according to the lateral free space.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving alert activation for rear collision avoidance are disclosed. As previously noted, providing rear-collision safety alerts that are accurate and avoid false activations can be a difficult task. As such, other drivers may not heed the rear-collision safety alerts because of these issues with the reliability of the alerts.

Therefore, in one embodiment, a collision detection system resolves the difficulties with false alerts by modifying a collision threshold for activating the alerts according to available lateral free space. For example, as the subject vehicle travels along a road, space to either side of the subject vehicle may vary. The variance in available lateral free space may occur due to many different aspects, such as obstacles, the configuration of the road, and so on. In any case, by considering whether the lateral free space is available or not, the disclosed approach can better assess whether an approaching target object (e.g., a vehicle) is likely to collide with the subject vehicle, is performing a lane change, or can otherwise avoid the subject vehicle by maneuvering into the lateral free space.

Therefore, in at least one arrangement, a subject vehicle implementing the collision detection system detects a target object that is approaching the subject vehicle from a rear position while further gathering sensor data about a surrounding environment. The subject vehicle may then determine characteristics of the vehicle/environment, such as a width of the approaching vehicle, a predicted path of the approaching vehicle, lateral free space next to the subject vehicle, and so on. According to the characteristics, the subject vehicle, in one or more approaches, modifies the collision threshold for activating an alert. For example, the subject vehicle may determine whether the lateral free space is of a particular size (e.g., satisfies a minimum distance for adjusting the collision threshold). In further aspects, the subject vehicle may determine the lateral free space as a relative measurement according to a width of the target vehicle (e.g., normalized to the width of the target vehicle). Using this information, the collision detection system modifies the collision threshold by, for example, adjusting an overlap threshold, a time-to-collision (TTC) threshold, or another aspect of how the collision detection system judges when to activate the alert. In this way, the subject vehicle can better determine when an alert may facilitate avoiding a collision and provides for avoiding false alerts.

Figure 1:
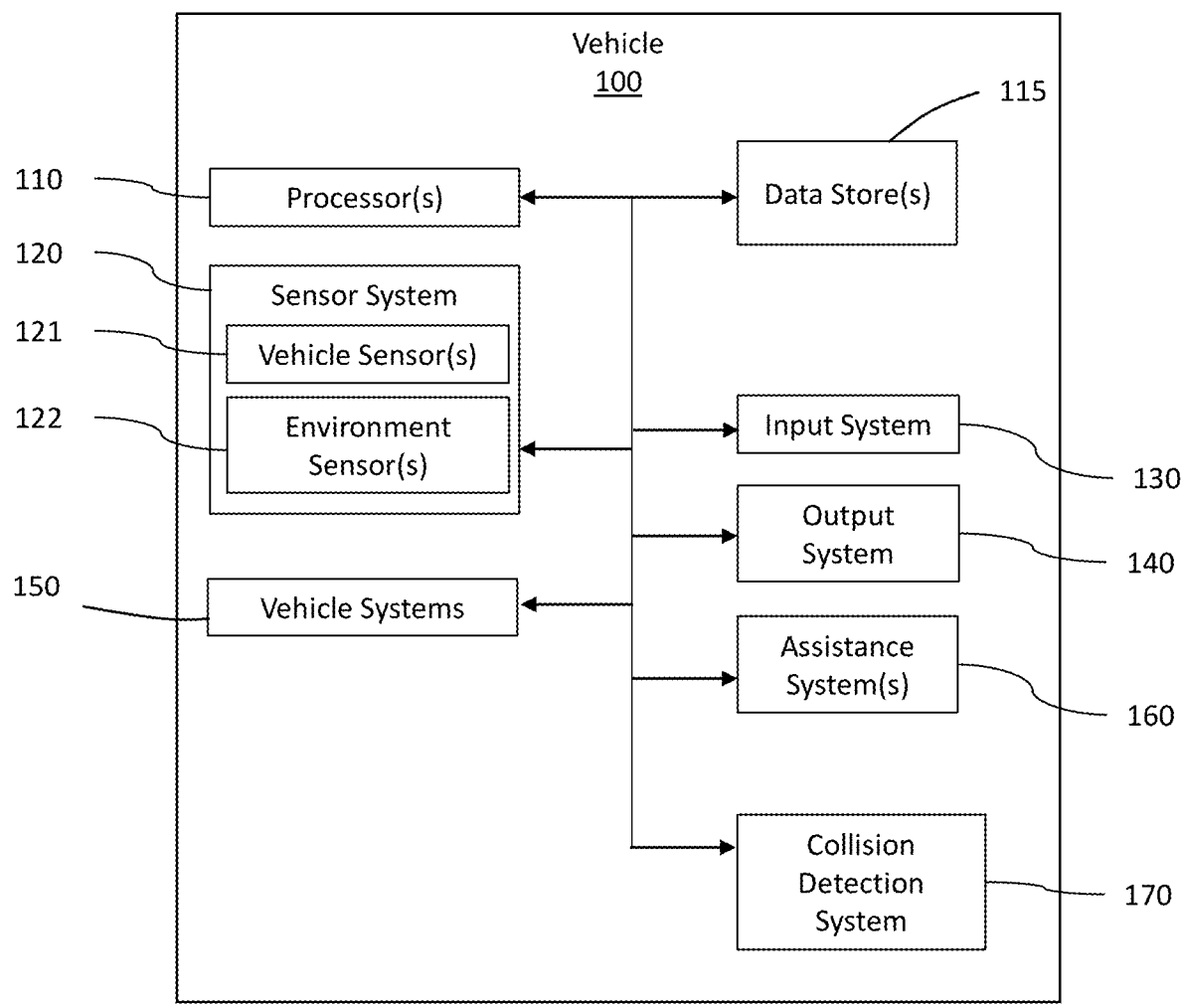
FIG. 1 illustrates one embodiment of a vehicle in which example systems and methods disclosed herein may operate.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of transport that benefits from the functionality discussed herein. It should be appreciated that the vehicle 100 is generally referred to as the subject vehicle 100 herein in order to further identify the vehicle 100 as the entity that is providing the alerts.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-9 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In either case, the vehicle 100 includes a collision detection system 170 that functions to improve rear-collision alerts. Moreover, while depicted as a standalone component, in one or more embodiments, the collision detection system 170 is integrated with the assistance system 160, or another similar system of the vehicle 100 as a sub-component thereof. The noted functions and methods will become more apparent with a further discussion of the figures.

Figure 2:
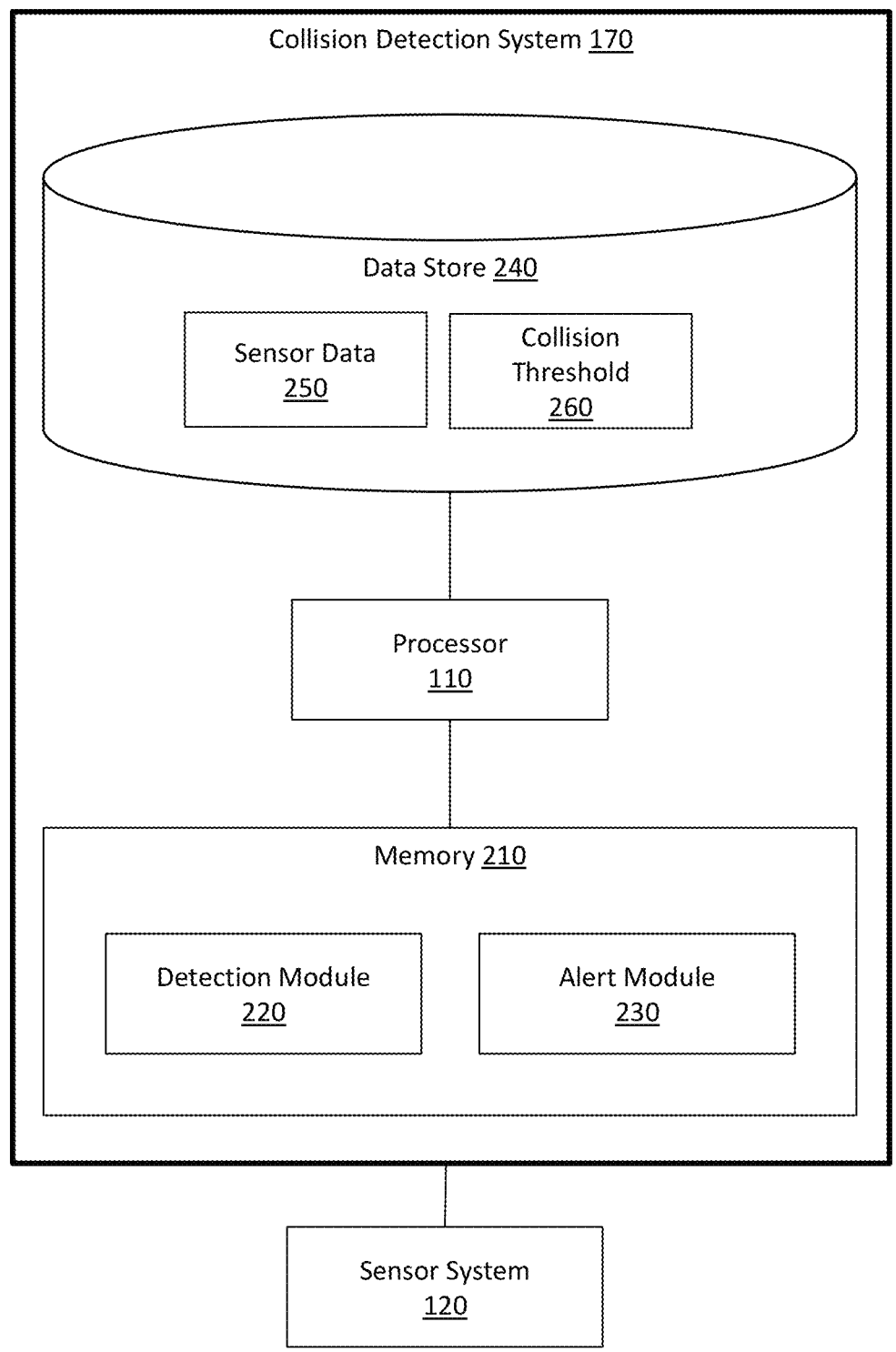
FIG. 2 illustrates one embodiment of a collision detection system that is associated with improving alert activation for rear collision avoidance.

With reference to FIG. 2, one embodiment of the collision detection system 170 is further illustrated. As shown, the collision detection system 170 includes a processor 110. Accordingly, the processor 110 may be a part of the collision detection system 170, or the collision detection system 170 may access the processor 110 through a data bus or another communication pathway. In one or more embodiments, the processor 110 is an application-specific integrated circuit that is configured to implement functions associated with a detection module 220 and an alert module 230. More generally, in one or more aspects, the processor 110 is an electronic processor such as a microprocessor that is capable of performing various functions as described herein when executing encoded functions associated with the collision detection system 170.

In one embodiment, the collision detection system 170 includes a memory 210 that stores the detection module 220 and the alert module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor 110, cause the processor 110 to perform the various functions disclosed herein. While, in one or more embodiments, the modules 220 and 230 are instructions embodied in the memory 210, in further aspects, the modules 220 and 230 include hardware, such as processing components (e.g., controllers), circuits, etcetera for independently performing one or more of the noted functions.

Furthermore, in one embodiment, the collision detection system 170 includes a data store 240. The data store 240 is, in one embodiment, an electronically-based data structure for storing information. In one approach, the data store 240 is a database that is stored in the memory 210 or another suitable storage medium, and that is configured with routines that can be executed by the processor 110 for analyzing stored data, providing stored data, organizing stored data, and so on. In any case, in one embodiment, the data store 240 stores data used by the modules 220 and 230 in executing various functions. In one embodiment, the data store 240 includes sensor data 250, and collision threshold 260 along with, for example, other information that is used by the modules 220 and 230.

Accordingly, the detection module 220 generally includes instructions that function to control the processor 110 to acquire data inputs from one or more sensors (e.g., the LiDAR sensor 123) of the vehicle 100 that form the sensor data 250. In general, the sensor data 250 includes information that embodies observations of the surrounding environment of the vehicle 100. The observations of the surrounding environment, in various embodiments, can include surrounding lanes, vehicles, objects, obstacles, etc. that may be present in the lanes, proximate to a roadway, within a parking lot, garage structure, driveway, or another area within which the vehicle 100 is operating.

While the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250. Thus, the sensor data 250, in one embodiment, represents a combination of perceptions acquired from multiple sensors.

Figure 3:
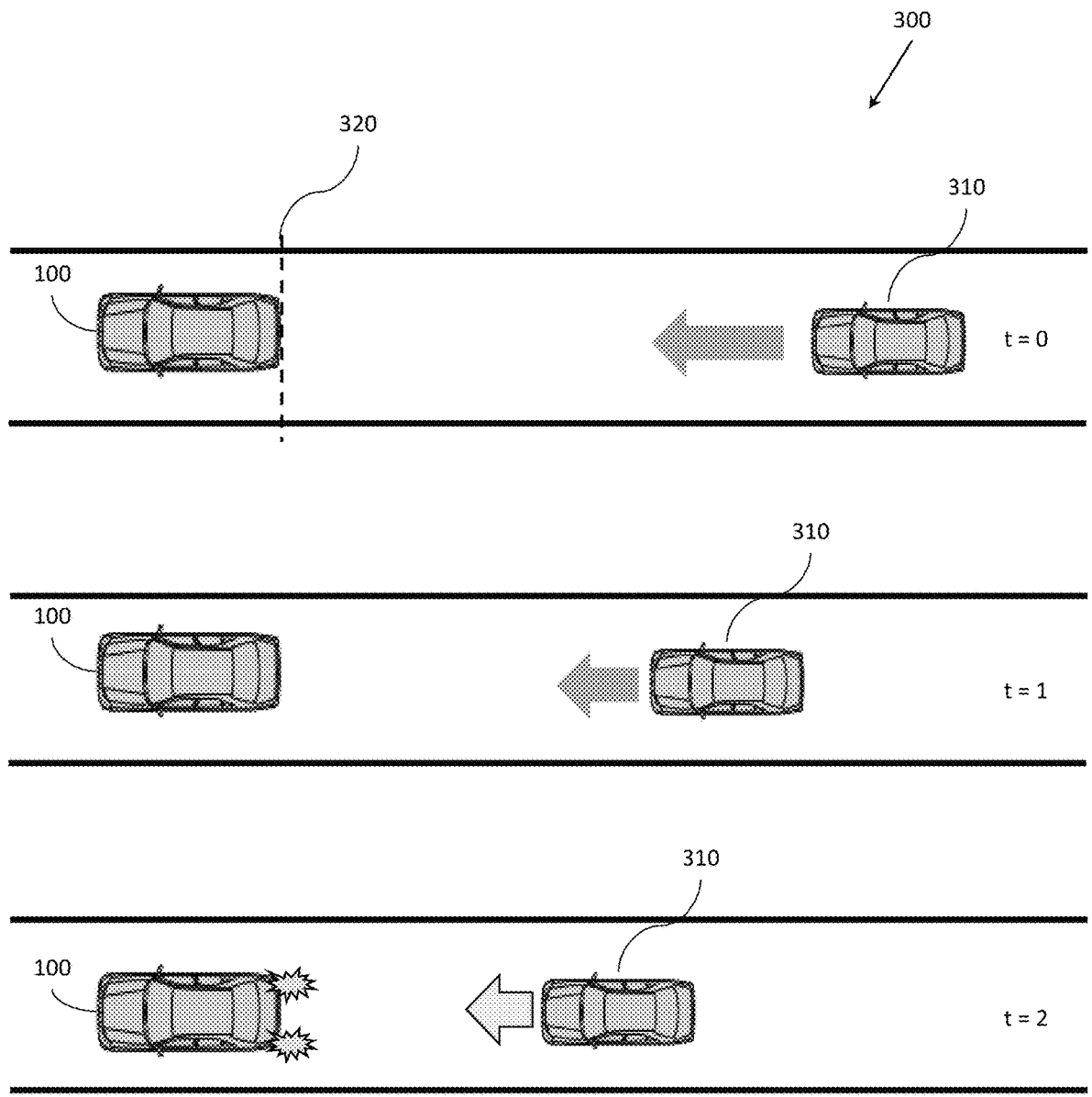
FIG. 3 illustrates one example scenario of a rear-collision alert.

Thus, whether the sensor data 250 is derived from a single sensor or multiple sensors, the sensor data 250 is comprised of information about a surrounding environment from which the collision detection system 170 can derive determinations about potential collisions and generate alerts in an attempt to thwart such collisions. As an additional explanation of the general premise of providing rear-collision avoidance alerts, FIG. 3 will now be addressed. FIG. 3 illustrates a series of relative positions 300 between the subject vehicle 100 and a target vehicle 310 that is approaching the subject vehicle from a rear position. Thus, as shown, the two vehicles may be traveling within a common lane of a roadway, or the subject vehicle 100 may be currently parked while the target vehicle 310 approaches. In either case, the scenario depicted in FIG. 3 is intended to represent an instance when the collision detection system 170 generates an alert.

Accordingly, at time t=0, the subject vehicle 100 may initially acquire sensor data 250 about the target vehicle 310 from which the subject vehicle 100 may derive a speed, position, etc. and estimate a path (i.e., a future trajectory) of the target vehicle 310. At time t=1, the target vehicle 310 continues to approach the subject vehicle 100; however, according to defined thresholds of the collision detection system 170, no alert is provided. The defined thresholds may correspond to the collision threshold 260, which, in one or more arrangements, includes an overlap threshold and a time-to-collision (TTC) threshold. The overlap threshold generally indicates an extent of overlap in width (i.e., from side-to-side) between the subject vehicle 100 and the target vehicle 310, while the TTC threshold indicates a time until the target vehicle is estimated to be at a location corresponding with a rear end of the subject vehicle 100 or a line 320 projected parallel with the rear end of the subject vehicle 100.

Accordingly, as shown at time t=2, once the collision detection system 170 determines that the target vehicle 310 satisfies the collision threshold, then the collision detection system 170 generates the alert. As shown in FIG. 3, the subject vehicle 100 flashes hazard lights (FHL) to warn the target vehicle 310. Of course, in further arrangements, the particular form of the alert itself may vary, but the collision detection system 170 generally forms the alert using an existing mechanism on the exterior of the subject vehicle 100 in order to convey the alert to the target vehicle without a specific need for additional hardware, such as additional lights, communication devices/protocols, and so on. Accordingly, the collision detection system 170 forms the alert to warn the target vehicle 310, thereby facilitating avoidance of a rear-end collision with the subject vehicle 100.

Returning to the discussion of FIG. 2, the detection module 220 functions to acquire the sensor data 250 and then further process the sensor data 250 into information that the alert module 230 uses to modify the collision threshold and/or generate alerts. For example, the detection module 220 may identify object instances, classify the object instances, determine characteristics (e.g., speed, position, etc.) of the classified object instances, and so on using the sensor data 250. Moreover, the detection module 220, in one or more configurations, uses the sensor data 250 to determine characteristics of the surrounding environment, such as lateral free space, locations of obstacles, and so on.

As used herein, lateral free space refers to unoccupied space, also referred to as a gap, along either side of the vehicle where there is no obstruction or obstacle and in which another object may freely pass depending on the particular size/extent of the free space. That is, the lateral free space may extend from a front end to a rear end of the vehicle 100 extending laterally outward from the vehicle. Often, the lateral free space corresponds to an area of an adjacent lane in which no other vehicles are traveling. Furthermore, the lateral free space may correspond to a burm, median, or road edge area. In any case, the detection module 220 analyzes the sensor data 250 to determine an extent/size of the lateral free space. As an additional point, while the present disclosure generally refers to the lateral free space in the singular, the collision detection system 170, in one or more arrangements, determines the lateral free space for either side (i.e., both the driver side and the passenger side) of the subject vehicle 100 in order to provide a comprehensive assessment of the surrounding environment.

Once the detection module 220 determines the noted aspects from the sensor data 250, the alert module 230, in one or more arrangements, then selectively modifies the collision threshold 260. For example, the alert module 230 may modify the collision threshold 260 according to the lateral free space. That is, depending on an extent/size of the lateral free space, the alert module 230 may modify the collision threshold 260 to better provide alerts by avoiding false alerts. In particular, adjusting the collision threshold 260 according to the lateral free space better accounts for potential lane changes of the target vehicle, thereby avoiding false alerts.

In one or more approaches, the alert module 230 determines whether the identified extent of the lateral free space satisfies a modification threshold. The modification threshold, in one or more arrangements, defines a size for the lateral free space at which the alert module 230 modifies the collision threshold 260. The size may define a minimum for the lateral free space at which the lateral free becomes too small for an object to pass beside the subject vehicle 100. In one or more approaches, the alert module 230 defines the modification threshold according to a category (e.g., narrow, mid, wide). The categories may be defined generally according to common widths of vehicles. In a further aspect, the alert module 230 may define the modification threshold relative to a width of the target object as perceived from the sensor data 250. In still further aspects, the alert module 230 may also consider the speed of the target object when determining whether to modify the collision threshold 260.

Accordingly, as part of deriving the characteristics from the sensor data 250, the detection module 220 may further estimate a target width of the target vehicle/object. Upon determining the width, the alert module 230 may then normalize the lateral free space according to the width of the lateral free space (e.g., divide the lateral free space by the target object width). As such, according to whether the normalized width of the lateral free space is less than one (indicating the lateral free space is smaller than the target object), is one within a defined margin (indicating the lateral free space is approximately the same as the width of the target object, or is greater that one (indicating the lateral free space is larger than the target object), as defined by the modification threshold, the alert module 230 can modify the collision threshold 260.

Turning to the collision threshold 260, in various approaches, the collision threshold 260 may include multiple separate components. For example, in at least one approach, the collision threshold includes a TTC threshold, an overlap threshold, and a predicted path indicator (i.e., the estimated path of the target object is within a threshold distance of the subject vehicle 100). Of course, in various arrangements, the particular set of subcomponents included within the collision threshold 260 may vary. For example, in one arrangement, the collision threshold 260 includes the TTC threshold, and the overlap threshold.

In any case, the TTC threshold defines a time until the target object is estimated to reach/collide with the subject vehicle 100. As discussed in relation to FIG. 3, the collision detection system 170 generally defines the TTC according to a line that is parallel with the rear end of the subject vehicle 100. Thus, when the target object reaches a distance from the subject vehicle 100 that corresponds with a defined time of the TTC threshold, then the alert module 230 determines that the target object satisfies the TTC threshold. The TTC threshold may have different values depending on the extent of the lateral free space from which the alert module 230 may dynamically modify the TTC threshold.

The overlap threshold defines an extent to which a width of the target object overlaps with the subject vehicle 100. In general, the alert module 230 defines the overlap threshold according to a percentage of the width of the target object. The overlap threshold may have different values depending on the extent of the lateral free space, and thus may serve as the basis for the alert module 230 modifying the overlap threshold according to current characteristics of the lateral free space. Moreover, the alert module 230 may further modify the overlap threshold according to the speed of the target object. The alert module 230 may consider the absolute speed of the target object or the relative speed of the target object in relation to the subject vehicle 100. That is, the alert module 230 may modify the overlap threshold when the speed of target object satisfies a speed threshold as defined by the modification threshold. The speed threshold may be defined in different grades in order to modify the overlap threshold further as the speed of the target object increases.

In various approaches, the alert module 230 may implement different aspects as part of the collision threshold 260 and thus may modify the collision threshold 260 differently according to the implementation. In any case, the alert module 230, in various implementations, modifies the collision threshold 260 for activating an alert to the target object. Thus, the modification threshold generally defines when the lateral free space and/or the speed of the target object are sufficient to perform the modifying. As set forth above, the alert module 230 uses the information derived from the sensor data 250 to make the determination about modifying the collision threshold 260 and then uses the collision threshold 260 to determine when to activate the alert to the target object. As one example, the alert module 230 may activate the alert when the target object satisfies the TTC threshold (e.g., the target object is less than 1.5 seconds from colliding) and the overlap threshold (e.g., overlap is greater than 20%) when the lateral free space is less than a target width of the target object.

Figure 4:
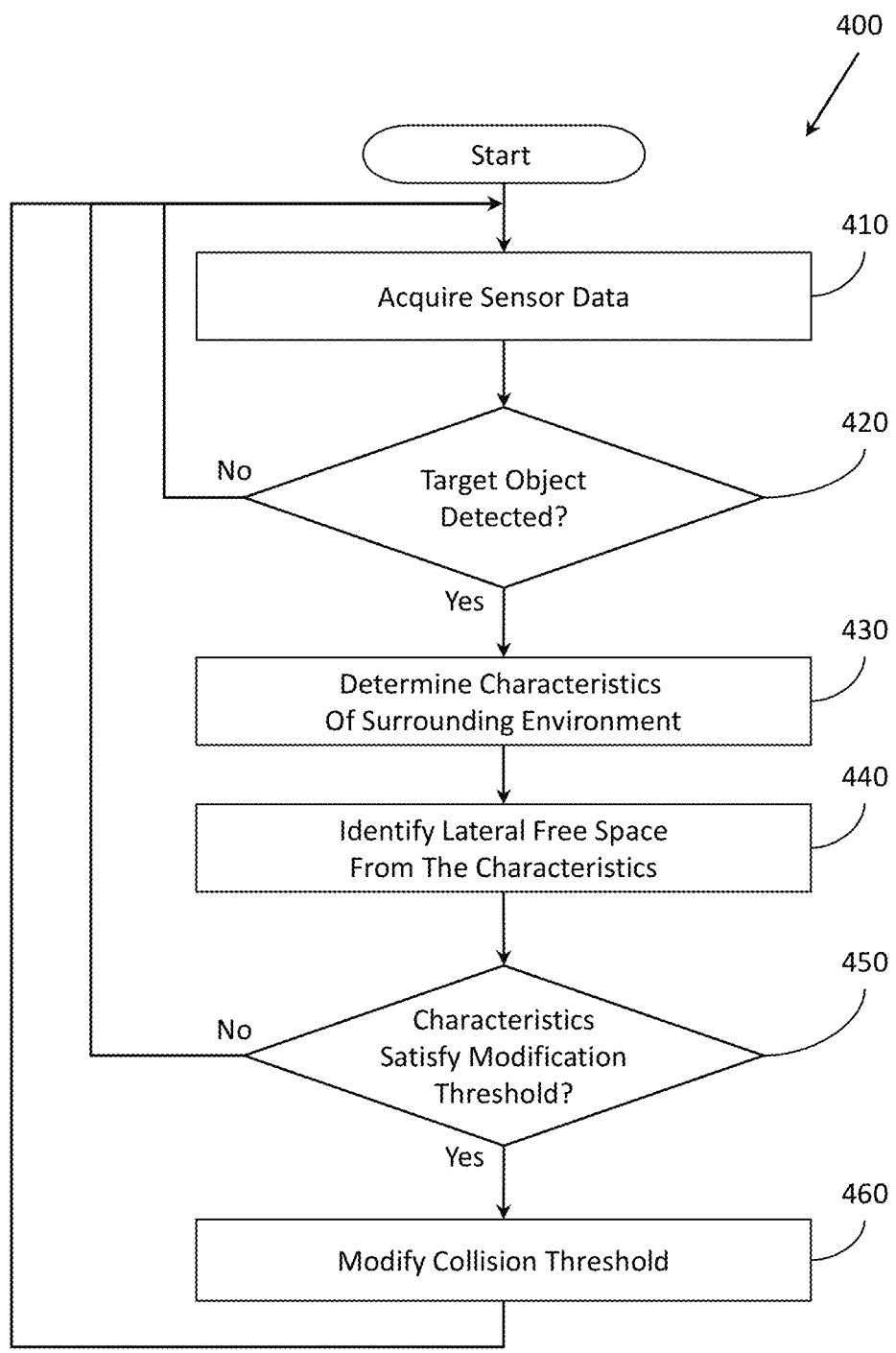
FIG. 4 illustrates one embodiment of a method associated with modifying a collision threshold for providing rear-collision alerts.

Additional aspects of improving alerts for rear-collision avoidance will be discussed in relation to FIG. 4. FIG. 4 illustrates a method 400 associated with modifying a collision threshold according to lateral free space. Method 400 will be discussed from the perspective of the collision detection system 170 of FIG. 1. While method 400 is discussed in combination with the collision detection system 170, it should be appreciated that the method 400 is not limited to being implemented within the collision detection system 170 but is instead one example of a system that may implement the method 400.

At 410, the detection module 220 acquires sensor data 250 from at least one sensor of the subject vehicle 100. In one embodiment, the detection module 220 acquires the sensor data 250 about a surrounding environment of the vehicle 100. As previously noted, the detection module 220, in one or more implementations, iteratively acquires the sensor data 250 from one or more sensors of the sensor system 120 to which the collision detection system 170 is communicatively coupled. The sensor data 250 includes observations of a surrounding environment of the subject vehicle 100, including regions behind and extending laterally outward from the vehicle. As noted previously, the detection module 220 acquires the sensor data 250 and may fuse observations from different sensors together in order to provide comprehensive information about the surrounding environment.

At 420, the detection module 220 detects whether a target object is located behind the subject vehicle 100. In general, the detection module 220 processes the sensor data 250 according to one or more routines, such as machine learning algorithms that identify separate instances of objects in the surrounding environment and may further classify the instances according to a classifier to identify a semantic class. Moreover, the detection module 220 is processing the sensor data 250 to generally identify separate aspects of the surrounding environment and determine whether the target object is at a rearward location of the subject vehicle 100.

At 430, the detection module 220 determines characteristics about the surrounding environment of the subject vehicle 100, including about the target object. That is, in at least one arrangement, the detection module 220 uses the sensor data 250 about the target object to determine a position, speed, a target width of the target object, and so on. It should be appreciated that the target object may take different forms, such as a passenger vehicle (e.g., sedan), a pick-up truck, a motorcycle, a bicycle, a semi-truck, a van, and so on. Thus, the target width will vary depending on the particular vehicle. As such, the detection module 220, in at least one embodiment, estimates the width of the target object in order to further assess whether to modify the collision threshold 260. Accordingly, the detection module 220 may determine further aspects about the surrounding environment, such as the presence of obstacles, other vehicles, lanes, etc.

Furthermore, the detection module 220 estimates a path of the target object from the sensor data 250. In one configuration, the detection module 220 may directly extrapolate a current heading in order to provide a coarse estimate of the future path of the target object. In a further approach, the detection module 220 may provide a projected trajectory that predicts lane changes or other more complex maneuvers. In any case, the detection module 220 is estimating the path of the target object to identify when and where the target object is likely to pass by or collide with the subject vehicle 100. From this estimate, the detection module 220 may determine a TTC, a side of the vehicle to which the target object may pass, and so on.

At 440, the detection module 220 analyzes the characteristics to identify lateral free space next to the subject vehicle 100. Thus, the detection module 220 is determining a size of the lateral free space between the subject vehicle 100 and one or more lateral obstacles. As previously noted, in one embodiment, determining the lateral free space includes determining the lateral free space relative to the target width. Accordingly, the detection module 220 may estimate a size of the lateral free space and divide the size by the target width of the target object. In this way, the detection module 220 can further assess whether the target object would fit through the lateral free space or not. Of course, the determination of whether the target object could fit through the lateral free space may depend on more than just a basic size comparison. That is, the target object is not likely to maintain a perfectly linear trajectory through the lateral free space, and, as such, the alert module 230 may account for this when determining whether to modify the collision threshold 260.

In a further aspect, the detection module 220 identifies a dynamic object or obstacle that may be traveling or present in an adjacent lane or nearby the subject vehicle 100 that may subsequently influence the lateral free space. That is, because the subject vehicle 100 may be moving and/or other aspects of the surrounding environment may be moving relative to the subject vehicle 100, the lateral free space may change over time. As such, the detection module 220 can track such dynamic objects in order to estimate the lateral free space at a time when the target object is to approach the subject vehicle 100. In this way, the detection module 220 can determine dynamic changes to the lateral free space and estimate a condition of the lateral free space at a time when the target object is proximate to the subject vehicle 100.

At 450, the alert module 230 determines whether the lateral free space satisfies the modification threshold. In one embodiment, the alert module 230 determines whether the lateral free space satisfies the modification threshold by identifying whether the lateral free space is insufficient to permit passage of the target object. In a further aspect, this determination may not be purely binary, but instead may consider different scenarios, such as whether the lateral free space is narrow (i.e., less than a width of the target object), mid (i.e., approximately the same as the target width), and wide (i.e., at least, for example, 10% larger the target width). Of course, in an instance when the target width is unknown, the separate categories may be defined according to static measurements associated with common target objects, such as an average width of other vehicles.

In a further aspect, the alert module 230 may also consider the speed of the target object and, according to the speed, further consider whether to adapt the collision threshold 260. That is, if the target object is moving slowly, and the lateral free space at least matches the target width of the target object, then the characteristics would not satisfy the modification threshold, and the alert module 230 would then not modify the collision threshold. However, in an instance when the speed of the target object is relatively higher, thereby inducing an expectation of less control, the alert module 230 would consider the modification threshold to be satisfied with the same lateral free space. In this way, the alert module 230 can mitigate the effects of higher speeds.

At 460, the alert module 230 modifies the collision threshold 260 for activating an alert to the target object. In one embodiment, the alert module 230 adapts a TTC threshold according to the lateral free space and/or an overlap threshold. In general, the alert module 230 may modify the collision threshold 260 in a binary fashion (e.g., adjusts an overlap threshold from 20% to 50%) or may provide a broader spectrum of modifications that depend directly on the specific value or category into which the lateral free space is classified. For example, the alert module 230 may determine a threat category of the lateral free space that accounts for an ability of the target object to avoid colliding with the subject vehicle 100. That is, as the lateral free space decreases, the alert module 230 may reduce the overlap threshold in a corresponding manner since the ability of the target object to avoid a collision is also reduced. The alert module 230 may consider the speed of the target object in a similar manner and, in a further approach, may consider a combination of the target speed with the lateral free space to determine an extent to which the collision threshold is to be modified. In this way, the collision detection system 170 better accounts for aspects of the surrounding environment when generating the alerts and thereby avoids false positives.

Figure 5:
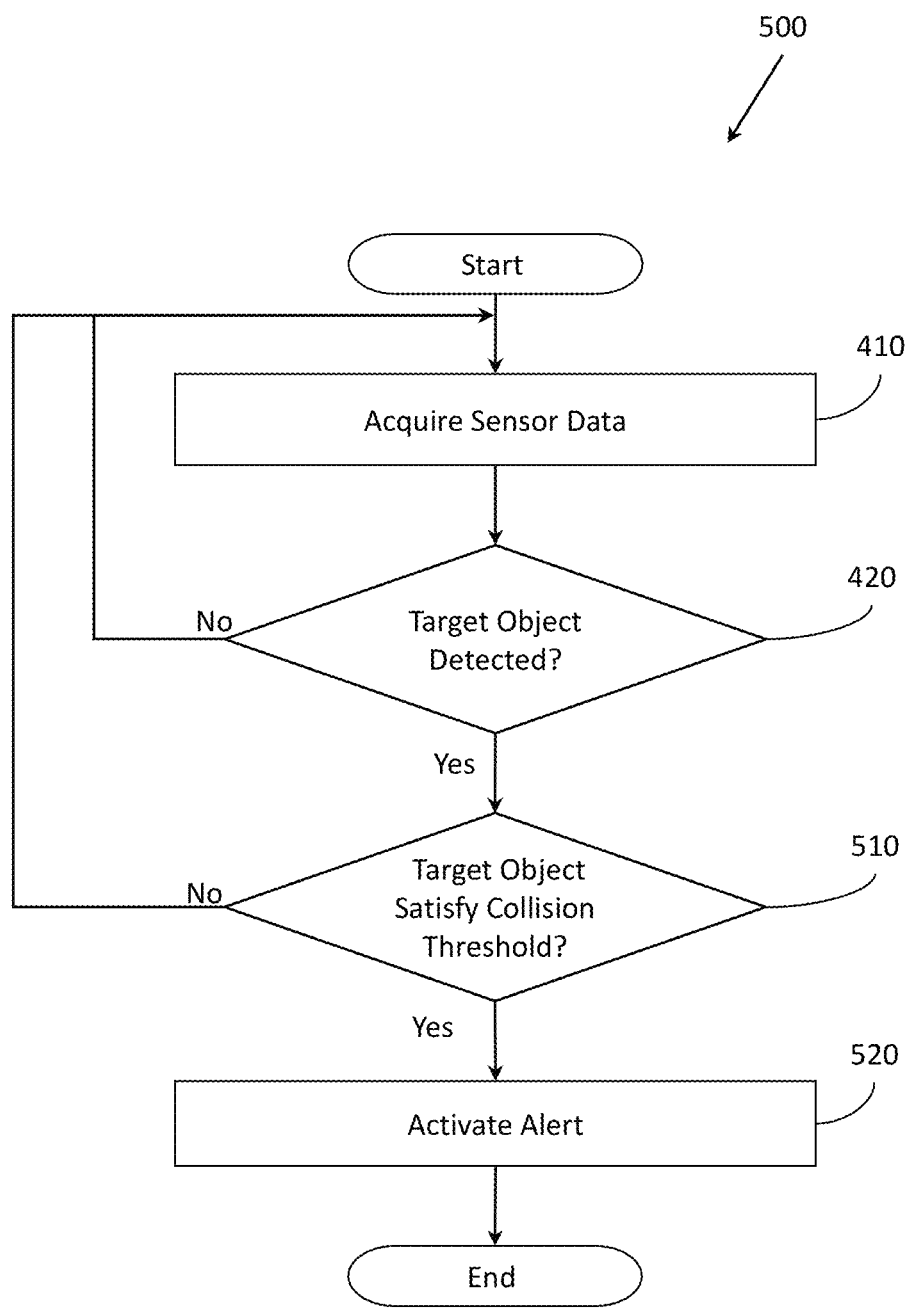
FIG. 5 illustrates one embodiment of a method associated with generating rear-collision alerts.

Aspects associated with generating an alert for rear-collision avoidance will be discussed in relation to FIG. 5. FIG. 5 illustrates a method 500 associated with generating an alert according to a collision threshold that may be dynamically modified based, at least in part, on lateral free space. Method 500 will be discussed from the perspective of the collision detection system 170 of FIG. 1. While method 500 is discussed in combination with the collision detection system 170, it should be appreciated that the method 500 is not limited to being implemented within the collision detection system 170 but is instead one example of a system that may implement the method 500.

Blocks 410 and 420 of the method 500 generally correspond to the same blocks of the method 400. Therefore, the description of the noted aspects will not be repeated herein. Moreover, it should be appreciated that the method 400 and the method 500 may execute in parallel as opposed to being serial processes. In any case, the alert module 230 uses the information about the target object in combination with the collision threshold 260 to determine whether to activate an alert to the target object.

At 510, the alert module 230 determines whether the target object satisfies the collision threshold 260. In one embodiment, the alert module 230 determines whether the overlap between the target object and the subject vehicle 100 satisfies (e.g., meets or exceeds) the overlap threshold component of the collision threshold 260. Furthermore, the alert module 230 also determines if the target object satisfies the TTC threshold component of the collision threshold 260. In general, if the noted subcomponents are satisfied, then the alert module 230 considers the collision threshold 260 to also be satisfied, and the process proceeds to block 520 and generating the alert. If the target object does not satisfy the collision threshold 260, then the method 500 repeats.

At 520, the alert module 230 activates the alert to the target object. As noted, the alert itself may take different forms depending on the implementation. However, in general, the alert includes activating lights on the exterior of the subject vehicle 100, such as rear blinkers (i.e., hazard lights). Activating the lights, in this way, provides a direct visual indicator to an operator of the target object of a potential hazard of collision with the subject vehicle 100, thereby avoiding a potential collision.

Figure 6:
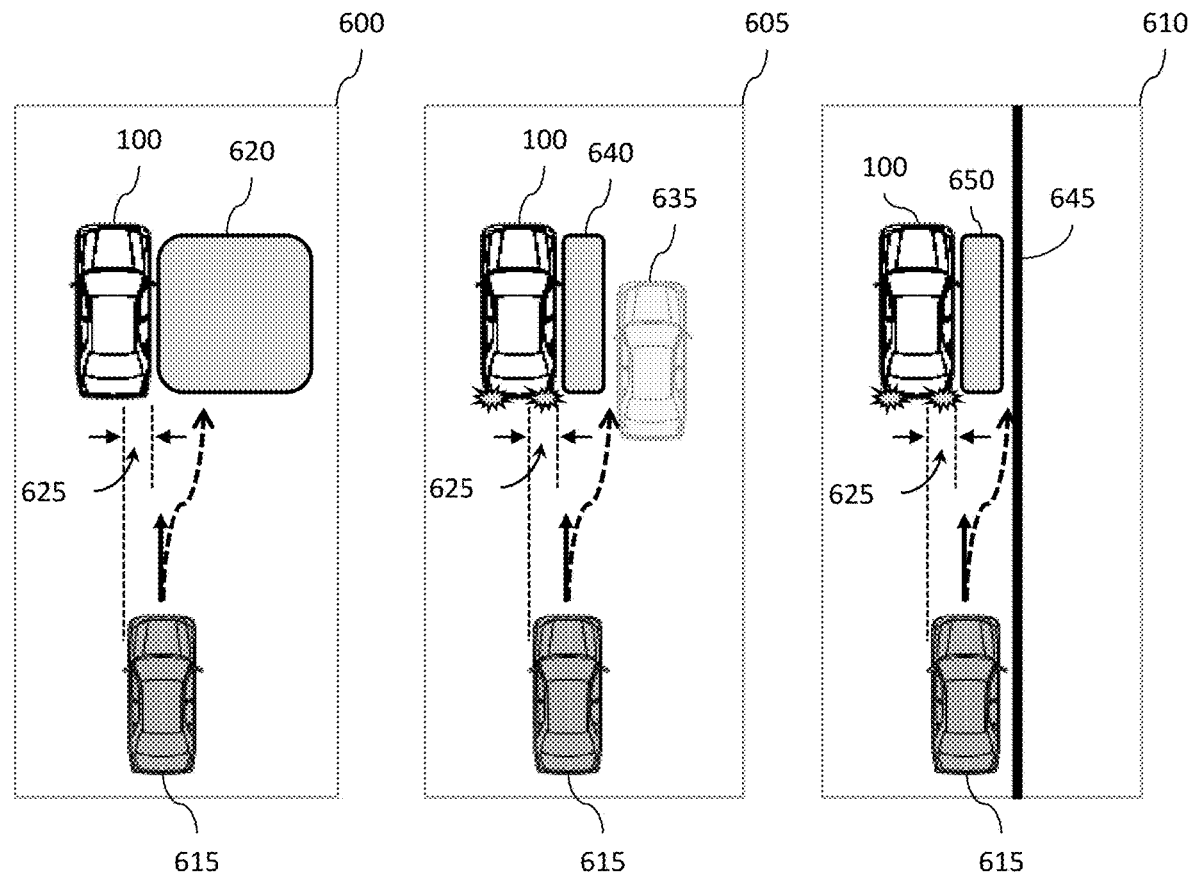
FIG. 6 illustrates a set of example scenarios of a target vehicle approaching a subject vehicle from a rear position.
Figure 6:
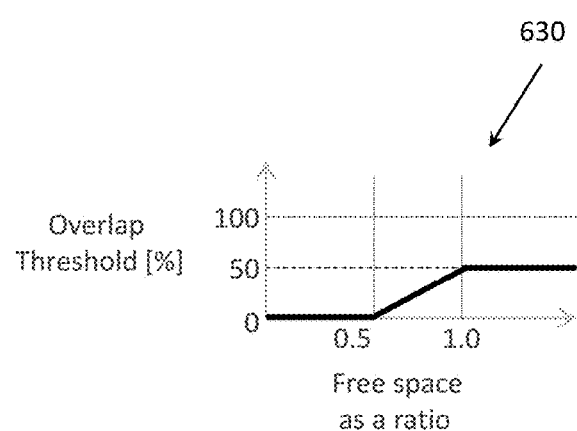

As a further explanation of how the presently disclosed systems and methods function, consider FIGS. 6-9. FIG. 6 illustrates a set of scenarios 600, 605, and 610 in which the subject vehicle 100 is traveling on a roadway, and a target object 615 is approaching the subject vehicle 100. As shown in scenario 600, lateral free space 620 is of a size that is significantly larger than the target object 615. Accordingly, the alert module 230 would not modify the collision threshold 260 since the lateral free space 620 provides adequate space for maneuvering around the subject vehicle 100, which is likely for a lane change. As such, even though overlap 625 between the target object 615 and the subject vehicle 100 may be 20% or more, the alert module 230 would not activate the alert since the target object 615 is likely performing a lane change. As shown in graph 630 of FIG. 6, for a ratio of greater than 1.0, the overlap threshold is 50%, which is not satisfied as shown in scenario 600.

By contrast, as shown in scenario 605, the vehicle 635 constrains the lateral free space 640 such that a maneuver by the target object 615 around the subject vehicle 100 is not feasible. Thus, as shown in the example of the graph 630, where the free space is less than 0.5 as a ratio of the target width, the alert module 230 adjusts the overlap threshold to zero. As such, the alert module 230 generates the alert once the target object 615 also satisfies the TTC threshold since there is overlap, as shown by overlap 625. In the scenario 610, a similar circumstance occurs due to the presence of guardrail 645. Thus, the lateral free space 650 is still not adequate, and the alert module 230 modifies the collision threshold 260 and generates the alert accordingly.

Figure 7:
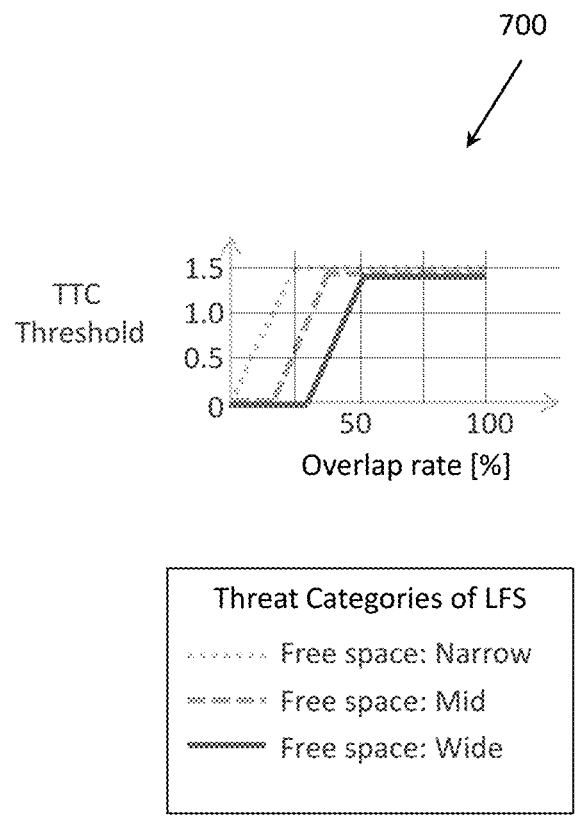
FIG. 7 illustrates an example of modifying a time-to-collision (TTC) threshold according to a threat category of lateral free space.

FIG. 7 illustrates a further example of how the collision threshold 260 may be modified. As shown in FIG. 7, graph 700 illustrates one example of how the alert module 230 may modify the TTC threshold component according to three separate threat categories of the lateral free space (LFS). Accordingly, depending on the extent of the lateral free space, the alert module 230 can modify the TTC threshold, as shown.

Figure 8:
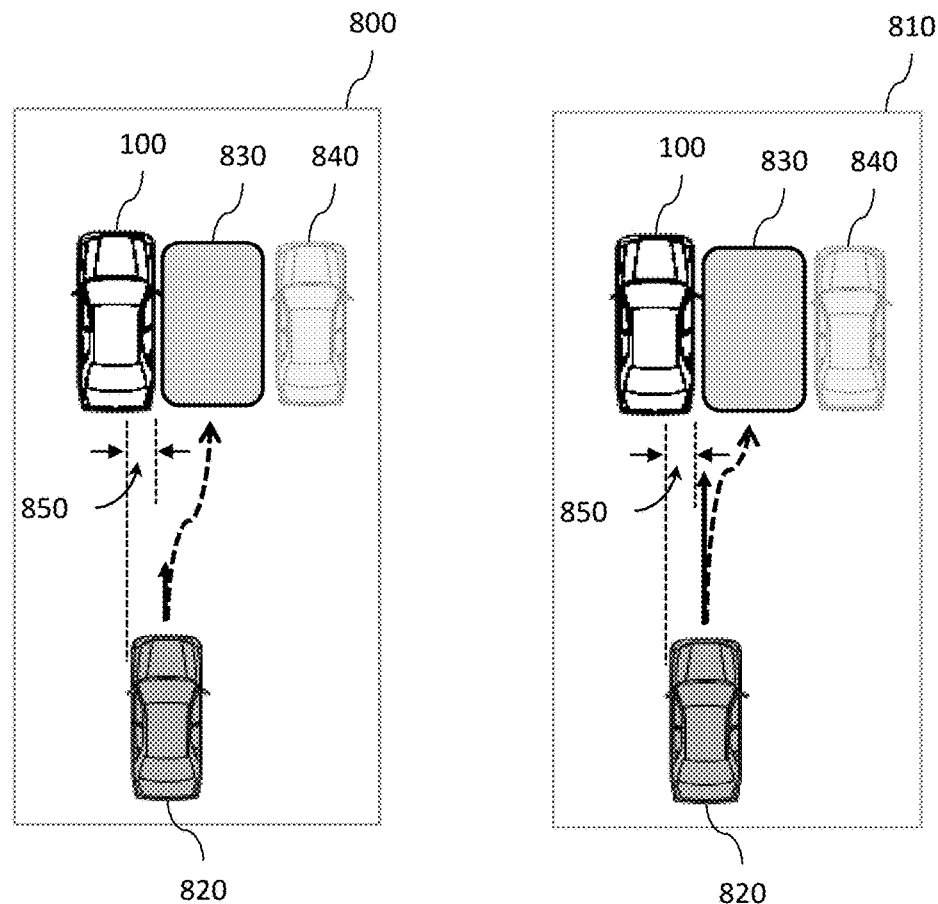
FIG. 8 illustrates an example of modifying a collision threshold according to a gap size of the lateral free space and a target vehicle speed.
Figure 8:
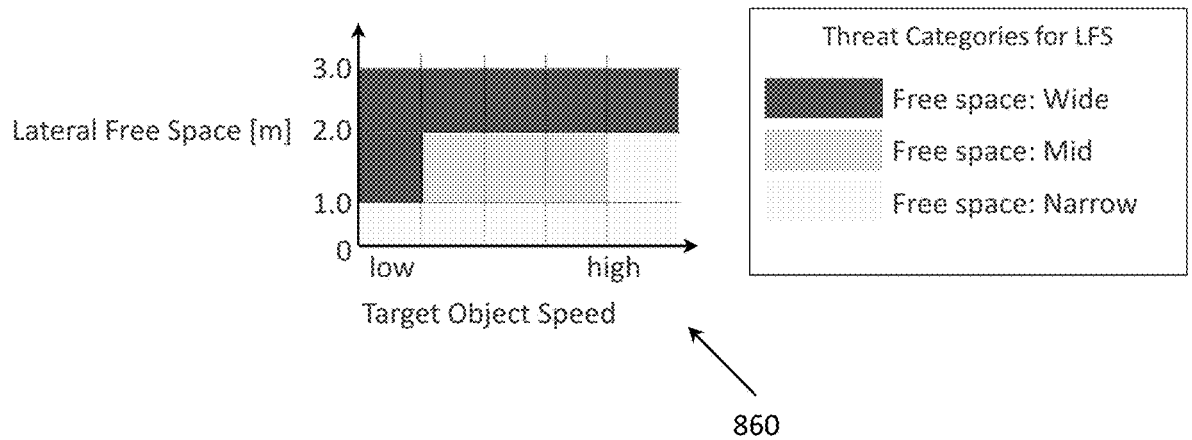

FIG. 8 illustrates two separate scenarios 800 and 810 that are associated with further considering target object speed in determining the category of the lateral free space, and thus whether the alert module 230 modifies the collision threshold 260. For example, as shown in scenario 800, the target object 820 is approaching the subject vehicle 100 at a low speed, as denoted by the short arrow projecting from the target object 820. Additionally, the lateral free space 830 is defined between the subject vehicle 100 and another vehicle 840. Further, an overlap 850 exists between the target object 820 and the subject vehicle 100. In any case, the only distinction between the scenario 800 and the scenario 810 is the speed of the target object 820 as represented by the arrow, and which influences the estimated path as shown in the dashed line with an arrow. Accordingly, as shown in graph 860, the collision detection system 170 defines the category of the lateral free space 830 according to both the size of the lateral free space 830 and the speed of the target object 820. Thus, for the separate scenarios 800 and 810, the collision detection system 170, in the instant example, defines the category of the lateral free space 830 differently and may modify the collision threshold 260 differently as well.

Figure 9:
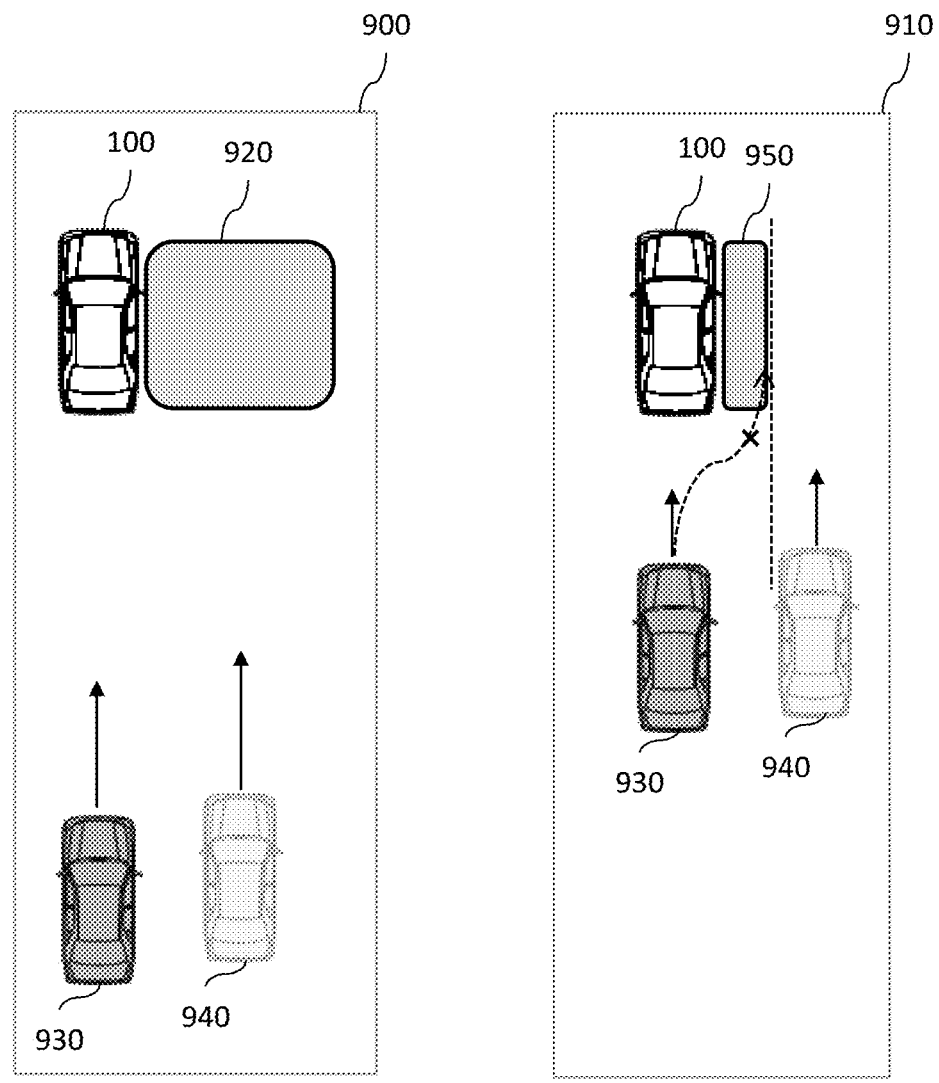
FIG. 9 illustrates an example of determining lateral free space according to a dynamic object.

FIG. 9 illustrates an example of a dynamic object that may influence the lateral free space. In particular, as shown in FIG. 9, the subject vehicle 100 is shown at time 900 and a subsequent time 910. At time 900, the subject vehicle 100 determines the lateral free space 920 with no further obstacles present proximate to the subject vehicle 100. However, as target object 930 approaches the subject vehicle, the dynamic object 940 also proceeds closer to the subject vehicle 100. The result of the dynamic object 940 moving closer to the subject vehicle 100 is a reduction in the lateral free space 920 to lateral free space 950. Accordingly, the collision detection system 170 originally identifies the dynamic object 940 and estimates the future position of the dynamic object 940 to predict the lateral free space 950 at a point in time when the target object 930 is to be proximate to the subject vehicle 100. In this way, the collision detection system 170 can determine a likely configuration of circumstances at a relevant time and more accurately generate the alert to avoid a collision with the target object 930.

Additionally, it should be appreciated that the collision detection system 170 from FIG. 1 can be configured in various arrangements with separate integrated circuits and/or electronic chips. In such embodiments, the detection module 220 is embodied as a separate integrated circuit. Additionally, the alert module 230 is embodied on an individual integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In another embodiment, the modules 220 and 230 may be combined into a separate application-specific integrated circuit. In further embodiments, portions of the functionality associated with the modules 220 and 230 may be embodied as firmware executable by a processor and stored in a non-transitory memory. In still further embodiments, the modules 220 and 230 are integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the collision detection system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 240) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps. In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level.

The one or more data stores 115 can include sensor data (e.g., sensor data 250). In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something.

The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements, or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1; however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the collision detection system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the collision detection system 170, and/or the assistance system 160 may control some or all of these vehicle systems 150 and, thus, may be partially or fully autonomous.

The processor(s) 110, the collision detection system 170, and/or the assistance system 160 can be operatively connected to communicate with the various vehicle systems 150 and/or individual components thereof. For example, returning to FIG. 1, the processor(s) 110, the collision detection system 170, and/or the assistance system 160 can be in communication to send and/or receive information from the various vehicle systems 150 to control the movement, speed, maneuvering, heading, direction, etc. of the vehicle 100. The processor(s) 110, the collision detection system 170, and/or the assistance system 160 may control some or all of these vehicle systems 150.

The processor(s) 110, the collision detection system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the collision detection system 170, and/or the assistance system 160 can control the direction and/or speed of the vehicle 100. The processor(s) 110, the collision detection system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the collision detection system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof to responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the collision detection system 170, can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A collision detection system, comprising:
  one or more processors;
  a memory communicably coupled to the one or more processors and storing:
    a detection module including instructions that, when executed by the one or more processors, cause the one or more processors to, responsive to detecting a target object that is located behind a subject vehicle and is moving, determine, by the subject vehicle, characteristics about a surrounding environment of the subject vehicle, including of the target object,
    wherein the detection module includes instructions to analyze the characteristics to identify lateral free space next to the subject vehicle that is an area without obstruction beside the subject vehicle and whether the lateral free space is adequate for the target object to maneuver around the subject vehicle; and an alert module including instructions that when executed by the one or more processors cause the one or more processors to modify a collision threshold for activating a warning to the target object according to the lateral free space.

2. The collision detection system of claim 1, wherein the alert module includes instructions to activate the alert from the subject vehicle to the target object according to whether the target object satisfies the collision threshold, wherein the collision threshold defines at least an overlap threshold that is an overlap amount between a subject width of the subject vehicle and a target width of the target object, and wherein the target object is moving in the surrounding environment.

3. The collision detection system of claim 1, wherein the detection module includes instructions to determine the characteristics including instructions to estimate a path of the target object and identify an overlap between a subject width of the subject vehicle and a target width of the target vehicle, and wherein the detection module includes instructions to analyze the characteristics to identify the lateral free space including instructions to determine a size of the lateral free space between the subject vehicle and a lateral obstacle relative to the target width.

4. The collision detection system of claim 1, wherein the detection module includes instructions to analyze the characteristics to identify the lateral free space including instructions to identify a dynamic object traveling with the subject vehicle and a projected path of the dynamic object in relation to the subject vehicle, and wherein the detection module includes instructions to identify the lateral free space including instructions to identify the lateral free space at a future time when the target vehicle and the dynamic object are proximate to the subject vehicle.

5. The collision detection system of claim 1, wherein the alert module includes instructions to modify the collision threshold including instructions to adapt a time to collision (TTC) threshold according to the lateral free space relative to a target width of the target object, and wherein the alert module includes instructions to modify the collision threshold according to the lateral free space avoids false activation of the alert to the target object.

6. The collision detection system of claim 1, wherein the detection module includes instructions to determine the characteristics including instructions to determine a target speed of the target object, and wherein the alert module includes instructions to modify the collision threshold including adjusting one or more of a time to collision (TTC) threshold and an overlap threshold based, at least in part, on the target speed.

7. The collision detection system of claim 1, wherein the alert module includes instructions to modify the collision threshold including instructions to determine a threat category of the lateral free space relative to a target width of the target object and to account for an ability of the target object to avoid colliding with the subject vehicle by adapting the collision threshold according to the threat category.

8. The collision detection system of claim 7, wherein the threat category corresponds to the lateral free space relative to the target object to define whether the target object fits through the lateral free space.

9. A non-transitory computer-readable medium storing instructions that, when executed by one or more processors, cause the one or more processors to:

responsive to detecting a target object that is located behind a subject vehicle and is moving, determine, by the subject vehicle, characteristics about a surrounding environment of the subject vehicle, including of the target object, analyze the characteristics to identify lateral free space next to the subject vehicle that is an area without obstruction beside the subject vehicle and whether the lateral free space is adequate for the target object to maneuver around the subject vehicle; and modify a collision threshold for activating a warning to the target object according to the lateral free space.

10. The non-transitory computer-readable medium of claim 9, wherein the instructions include instructions to activate the alert from the subject vehicle to the target object according to whether the target object satisfies the collision threshold, wherein the collision threshold defines at least an overlap threshold that is an overlap amount between a subject width of the subject vehicle and a target width of the target object, and wherein the target object is moving in the surrounding environment.

11. The non-transitory computer-readable medium of claim 9, wherein the instructions to determine the characteristics include instructions to estimate a path of the target object and identify an overlap between a subject width of the subject vehicle and a target width of the target vehicle, and wherein the instructions to analyze the characteristics to identify the lateral free space include instructions to determine a size of the lateral free space between the subject vehicle and a lateral obstacle relative to the target width.

12. The non-transitory computer-readable medium of claim 9, wherein the instructions to analyze the characteristics include instructions to identify a dynamic object traveling with the subject vehicle and a projected path of the dynamic object in relation to the subject vehicle, and wherein the instructions to identify the lateral free space include instructions to identify the lateral free space at a future time when the target vehicle and the dynamic object are proximate to the subject vehicle.

13. The non-transitory computer-readable medium of claim 9, wherein the instructions to modify the collision threshold including instructions to adapt a time to collision (TTC) threshold according to the lateral free space relative to a target width of the target object, and wherein the instructions to modify the collision threshold according to the lateral free space avoids false activation of the alert to the target object.

14. A method, comprising:

responsive to detecting a target object that is located behind a subject vehicle and is moving, determining, by the subject vehicle, characteristics about a surrounding environment of the subject vehicle, including of the target object;

analyzing the characteristics to identify lateral free space next to the subject vehicle that is an area without obstruction beside the subject vehicle and whether the lateral free space is adequate for the target object to maneuver around the subject vehicle; and modifying a collision threshold for activating an alert to the target object according to the lateral free space.

15. The method of claim 14, further comprising:
activating the alert from the subject vehicle to the target object according to whether the target object satisfies the collision threshold, wherein the collision threshold defines at least an overlap threshold that is an overlap amount between a subject width of the subject vehicle and a target width of the target object, and wherein the target object is moving in the surrounding environment.

16. The method of claim 14, wherein determining the characteristics includes estimating a path of the target object and identifying an overlap between a subject width of the subject vehicle and a target width of the target vehicle, and
wherein analyzing the characteristics to identify the lateral free space includes determining a size of the lateral free space between the subject vehicle and a lateral obstacle relative to the target width.

17. The method of claim 14, wherein analyzing the characteristics to identify the lateral free space includes identifying a dynamic object traveling with the subject vehicle and a projected path of the dynamic object in relation to the subject vehicle, and
wherein identifying the lateral free space includes identifying the lateral free space at a future time when the target vehicle and the dynamic object are proximate to the subject vehicle.

18. The method of claim 14, wherein modifying the collision threshold includes adapting a time to collision (TTC) threshold according to the lateral free space relative to a target width of the target object, and
wherein modifying the collision threshold according to the lateral free space avoids false activation of the alert to the target object.

19. The method of claim 14, wherein determining the characteristics includes determining a target speed of the target object, and
wherein modifying the collision threshold includes adjusting one or more of a time to collision (TTC) threshold and an overlap threshold based, at least in part, on the target speed.

20. The method of claim 14, wherein modifying the collision threshold includes determining a threat category of the lateral free space relative to a target width of the target object and accounting for an ability of the target object to avoid colliding with the subject vehicle by adapting the collision threshold according to the threat category, and
wherein the threat category corresponds to the lateral free space relative to the target object to define whether the target object fits through the lateral free space.

* * * * *